US012451033B2

(12) United States Patent
Franklin et al.

(10) Patent No.: US 12,451,033 B2
(45) Date of Patent: *Oct. 21, 2025

(54) ADAPTIVE BILLBOARD FRAME MOUNT SYSTEM

(71) Applicant: Formetco, LLC, Duluth, GA (US)

(72) Inventors: Robert Lee Franklin, Snellville, GA (US); Jonathon Christopher Adams, Hoschton, GA (US); Brian David Jeffries, Duluth, GA (US)

(73) Assignee: Formetco, LLC, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,337

(22) Filed: Feb. 2, 2024

(65) Prior Publication Data

US 2024/0177636 A1 May 30, 2024

Related U.S. Application Data

(63) Continuation of application No. 17/872,654, filed on Jul. 25, 2022, now Pat. No. 11,900,833.

(60) Provisional application No. 63/225,770, filed on Jul. 26, 2021.

(51) Int. Cl.
*G09F 15/00* (2006.01)

(52) U.S. Cl.
CPC ...... *G09F 15/0012* (2013.01); *G09F 15/0037* (2013.01)

(58) Field of Classification Search
CPC ......................... G09F 15/0012; G09F 15/0037
See application file for complete search history.

(56) References Cited

U.S. PATENT DOCUMENTS

| | | | | | |
|---|---|---|---|---|---|
| 1,623,047 | A * | 4/1927 | Cook | G09F 15/0006 | 296/29 |
| 2,116,844 | A * | 5/1938 | Overholtz | G09F 1/12 | 52/656.1 |
| 2,151,872 | A * | 3/1939 | Rosner | G09F 15/0006 | 40/624 |
| 2,599,129 | A * | 6/1952 | Michael | G09F 15/0006 | 52/696 |
| 2,948,976 | A * | 8/1960 | Miller, Jr. | G09F 15/0006 | 52/762 |

(Continued)

FOREIGN PATENT DOCUMENTS

| | | |
|---|---|---|
| CN | 208985628 U | 6/2019 |
| KR | 20-0287329 Y1 | 8/2002 |

OTHER PUBLICATIONS

International Search Report and the Written Opinion of the International Search Authority for PCT/US2022/038194, mailed Oct. 28, 2022.

*Primary Examiner* — David R Dunn
*Assistant Examiner* — Christopher E Veraa
(74) *Attorney, Agent, or Firm* — Womble Bond Dickinson (US) LLP

(57) ABSTRACT

An adaptive billboard frame mount system, and methods of use thereof, that is configured to mount to a plurality of fixedly positioned pre-existing poles. The billboard frame mount system includes a frame assembly and a plurality of mount assemblies configured to be coupled to the plurality of fixedly positioned pre-existing poles and the frame assembly such that a formed frame of the frame assembly can be positioned in a display plane that is oriented at a desired angle relative to vertical.

38 Claims, 12 Drawing Sheets

(56) References Cited

U.S. PATENT DOCUMENTS

| | | | | |
|---|---|---|---|---|
| 2,993,289 | A * | 7/1961 | Miller, Jr. | G09F 15/0006 D20/39 |
| 3,373,517 | A * | 3/1968 | Halperin | G09F 11/025 40/624 |
| 3,477,158 | A | 11/1969 | Chandos | |
| 7,481,013 | B2 * | 1/2009 | Black | F16B 7/0493 40/784 |
| 11,367,370 | B2 | 6/2022 | Innis | |
| 11,741,860 | B2 | 8/2023 | Innis | |
| 11,900,833 | B2 * | 2/2024 | Franklin | G09F 15/0012 |
| 2005/0029419 | A1 | 2/2005 | Ware et al. | |
| 2006/0022099 | A1 | 2/2006 | Sparkowski | |
| 2006/0185205 | A1 | 8/2006 | Black | |
| 2011/0225860 | A1 | 9/2011 | Troiano et al. | |
| 2019/0325793 | A1 | 10/2019 | Rackley et al. | |
| 2021/0264825 | A1 | 8/2021 | Innis | |

* cited by examiner

ADAPTIVE BILLBOARD FRAME MOUNT SYSTEM

CROSS REFERENCE

The present patent application is a Continuation of U.S. application Ser. No. 17/872,654, filed Jul. 25, 2022, now U.S. Pat. No. 11,900,833, issued on Feb. 13, 2024, which claims benefit of U.S. Provisional Application No. 63/225,770, filed Jul. 26, 2021.

INCORPORATION BY REFERENCE

The disclosures of U.S. application Ser. No. 17/872,654, filed Jul. 25, 2022, now U.S. Pat. No. 11,900,833, issued on Feb. 13, 2024, which claims benefit of U.S. Provisional Application No. 63/225,770, filed Jul. 26, 2021, are hereby incorporated by reference for all purposes as if presented herein in their entireties.

TECHNICAL FIELD

The present disclosure relates generally to systems, apparatus and methods in the field of outdoor displays or billboards, more particularly, to various aspects involving systems and methods for an improved billboard mounting system that is configurable for mounting to potentially irregularly oriented fixed poles mounted into the ground.

BACKGROUND

Retrofitting non-digital billboards is typically expensive, time consuming and labor intensive. Moreover, simply removing an older billboard assembly from the billboard's mounting poles, which are fixedly mounted into the ground surface and replacing it with a new billboard display assembly has not proven entirely satisfactory since the fixedly positioned poles to which the older installed billboard was attaches do not typically extend normal to the underlying ground surface. Overtime, each of the existing fixedly mounted poles typically migrates to a position that is not vertical and is not equally spaced from the respective adjacent poles. Because of the irregular positioning of the preexisting mounting poles, installing a new billboard represents a substantial capital outlay as the removal of the old mounting holes and the installation of new mounting poles positioned in the desired vertical orientation makes it financially difficult to replace older billboards Therefore, it would be desirable to have an adaptive billboard frame mount system that can be easily and quickly installed on the pre-existing billboard mounting poles, without the need to replace any irregularly oriented mounting poles, to provide for positioning the frame of the formed billboard is a desired planar orientation.

SUMMARY

To improve the state of the art, disclosed herein is an adaptive billboard frame mount system, and methods of use thereof, utilizing novel functionalities. The adaptive billboard frame mount system is configured to mount to a plurality of fixedly positioned pre-existing poles. The billboard frame mount system includes a frame assembly and a plurality of mount assemblies that configured to be coupled to the plurality of fixedly positioned pre-existing poles and the frame assembly such that a formed frame of the frame assembly can be positioned in a display plane that is oriented at a desired angle relative to vertical.

In one aspect, the frame assembly includes an upper strut and an opposed and parallel lower strut that are connected to respective opposed and parallel side struts to form the frame that positioned in the display plane.

The plurality of mount assemblies includes a plurality of upper mount assemblies and a plurality of lower mount assemblies that are configured to be mounted to selected poles of the plurality of fixedly positioned pre-existing poles. In one exemplary aspect, each mount assembly includes a pole mount, a channel member, and an extension member. In this aspect, the pole mount is configured to be fixedly mounted to an exterior surface of a fixedly positioned pre-existing pole; the channel member is configured for receipt there through defined channel openings of the respective pole mount; and the extension member has one end configured to be connected to an end portion of the channel member and the opposing end configured to connect to portion of the struts forming the frame assembly.

Still other aspects, embodiments, and advantages of these exemplary aspects and embodiments, are discussed in detail below. Moreover, it is to be understood that both the foregoing information and the following detailed description are merely illustrative examples of various aspects and embodiments and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than can be necessary for a fundamental understanding of the exemplary embodiments discussed herein and the various ways in which they can be practiced. According to common practice, the various features of the drawings discussed below are not necessarily drawn to scale. Dimensions of various features and elements in the drawings can be expanded or reduced to more clearly illustrate the embodiments of the disclosure.

DETAILED DESCRIPTION

Figure 1:
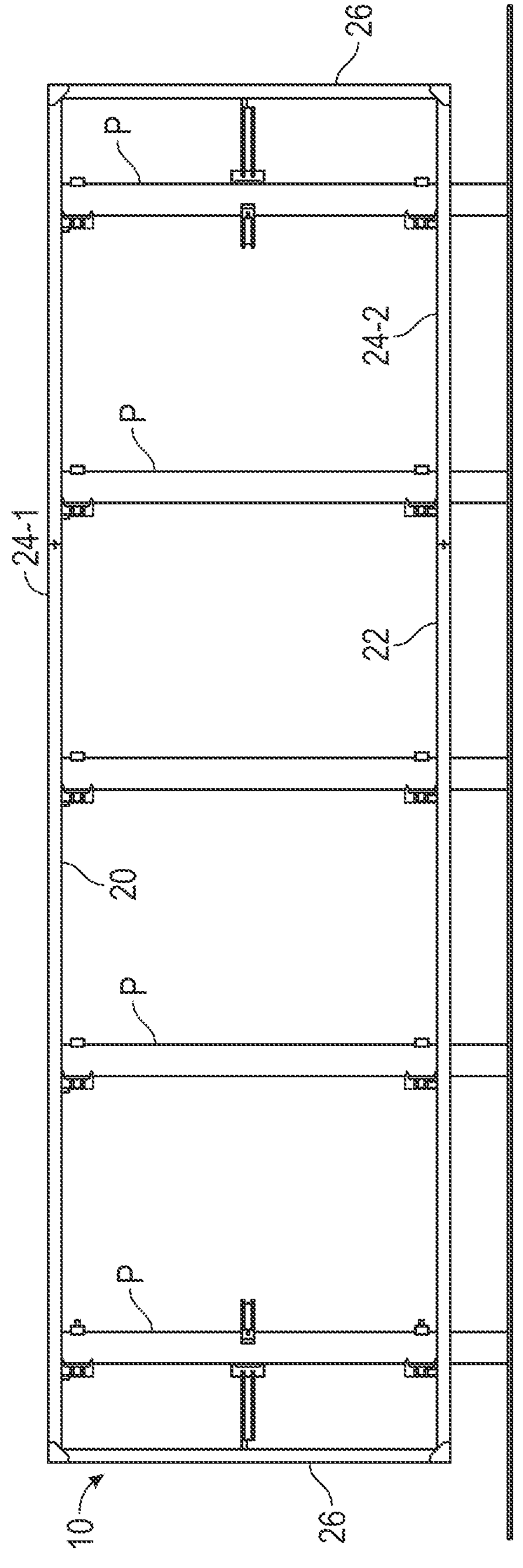
FIG. 1 schematically illustrates an example of an adaptive billboard frame mount system mounted to a plurality of fixedly positioned pre-existing poles.
Figure 2:
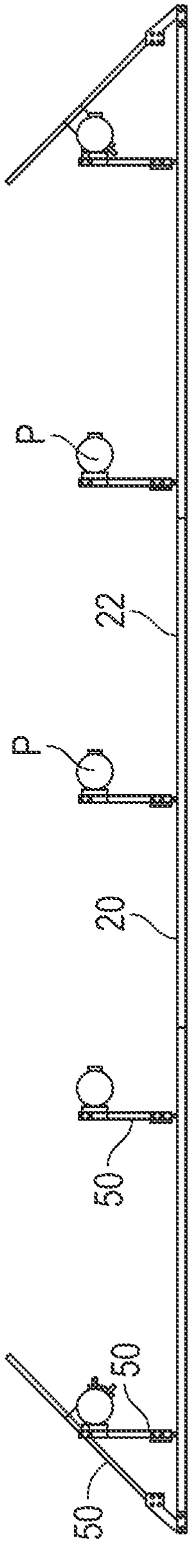
FIG. 2 schematically illustrates a top elevational view of the adaptive billboard frame mount system of FIG. 1.
Figure 3:
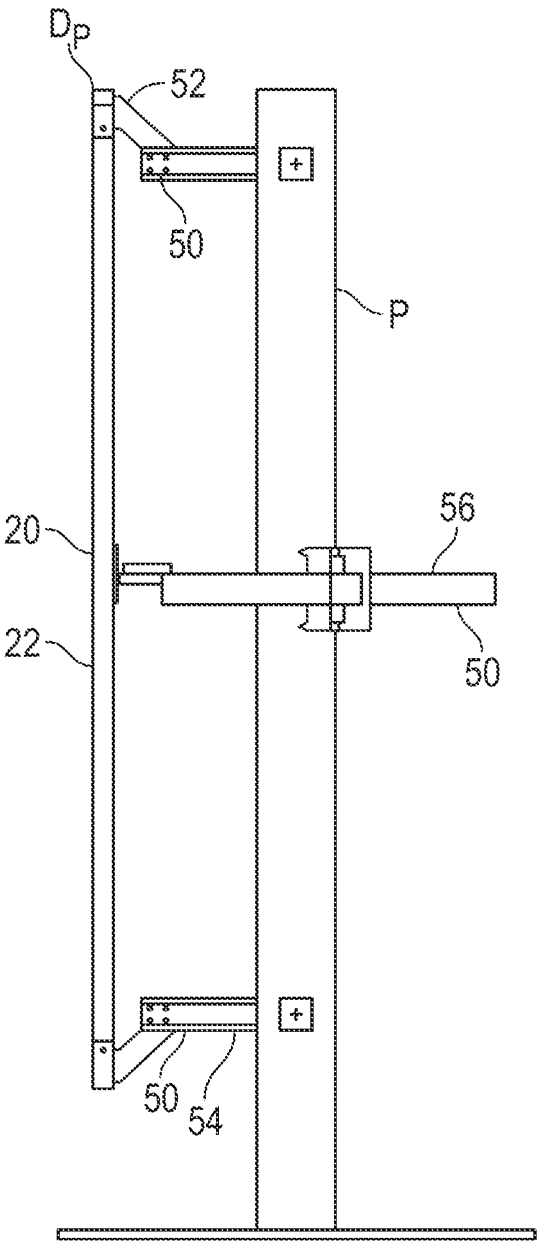
FIG. 3 schematically illustrates a side elevational view of the adaptive billboard frame mount system of FIG. 1.
Figure 4:
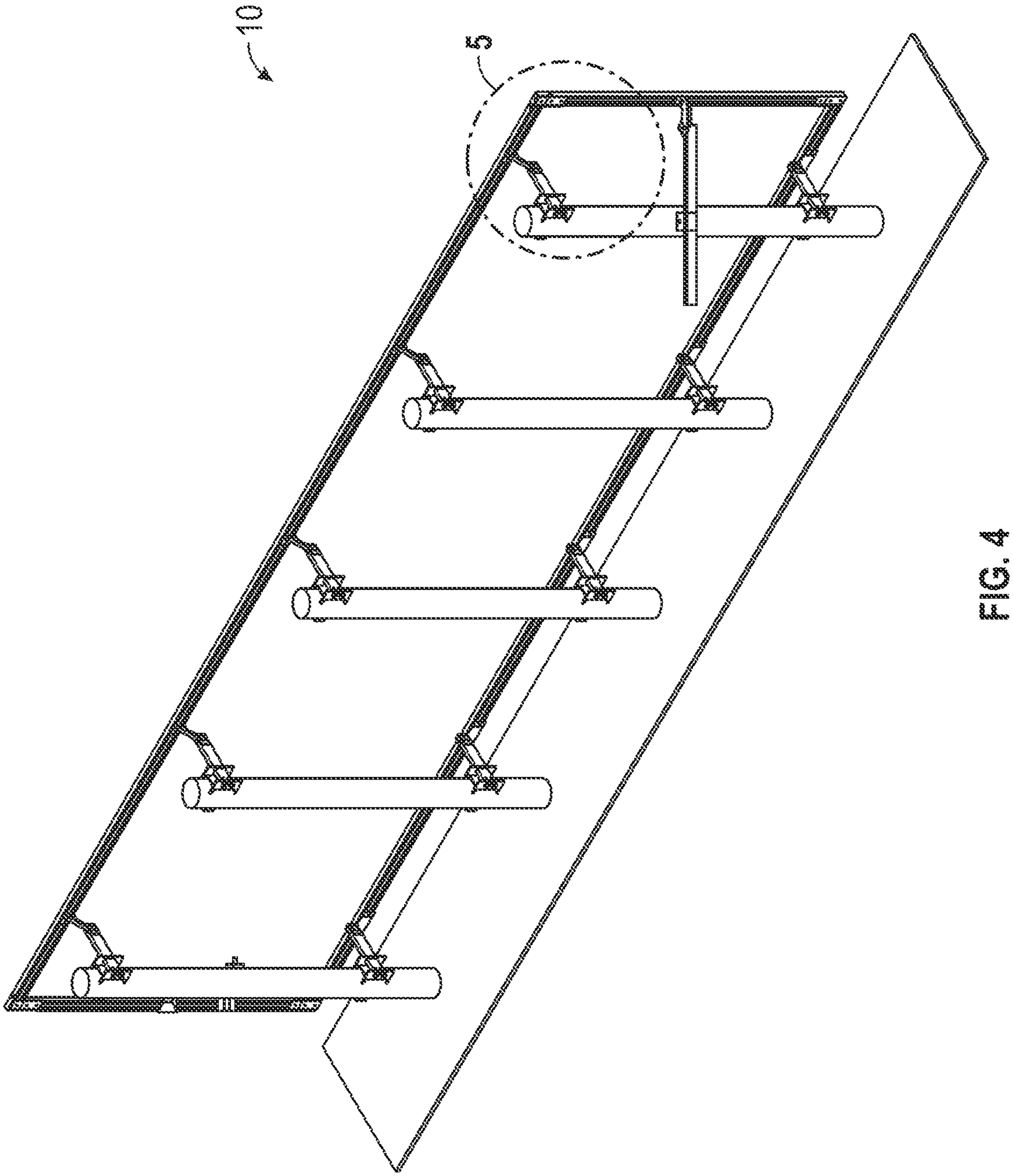
FIG. 4 schematically illustrates a perspective view of the adaptive billboard frame mount system of FIG. 1.
Figure 6:
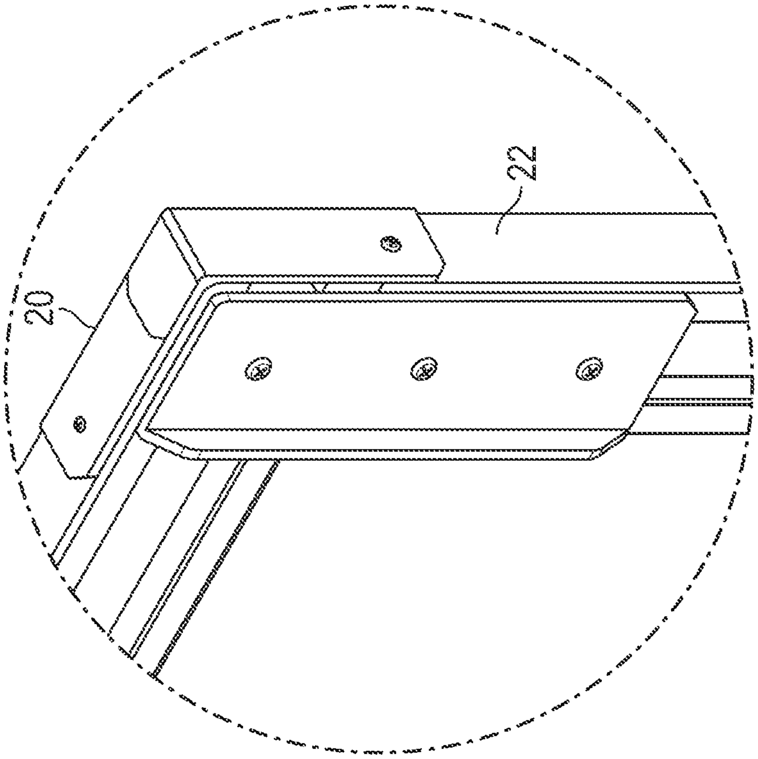
FIG. 6 is an enlarged illustration of a portion of the adaptive billboard frame mount system noted under C in FIG. 5, showing the coupling of an end of an upper strut to an end of respective side strut of the frame assembly.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a mount assembly" can include two or more such mount assemblies unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "can," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular embodiment.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Disclosed are components that can be used to perform the disclosed methods and systems. These and other components are disclosed herein, and it is understood that when combinations, subsets, interactions, groups, etc. of these components are disclosed that while specific reference to each various individual and collective combinations and permutation of these cannot be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems can be understood more readily by reference to the following detailed description of preferred embodiments and the examples included therein and to the Figures and their previous and following description.

Referring to FIG. 1, disclosed herein is an adaptive billboard frame mount system 10, and methods of use thereof, that is configured to mount to a plurality of fixedly positioned pre-existing poles P. One skilled in the art will appreciate that the fixedly positioned pre-existing poles that remain when an existing billboard support 7| Page structure is removed are typically not oriented vertically but have, overtime, migrated to other positions that are angled relative to vertical. Thus, it is common for each pole of the fixedly positioned pre-existing poles to vary in vertical orientation and to vary in relative orientation to other poles in the grouping of fixedly positioned pre-existing poles.

As shown in FIGS. 1-5 the adaptive billboard frame mount system 10 includes a frame assembly 20 and a plurality of mount assemblies 50 that are configured to be coupled to the plurality of fixedly positioned pre-existing poles P and the frame assembly 20 such that a formed frame 22 of the frame assembly 20 can be positioned in a display plane Dp that is oriented at a desired angle relative to vertical.

Figure 15:
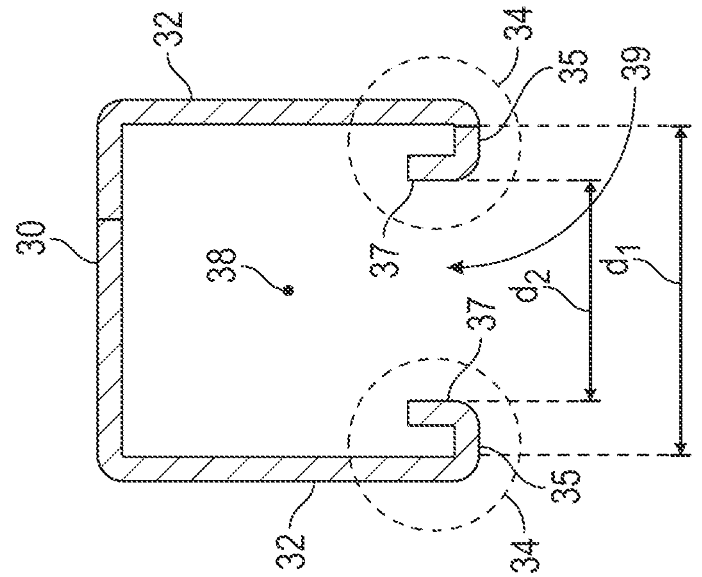
FIG. 15 is a cross-sectional schematic of the exemplary strut of the frame assembly.
Figure 14:
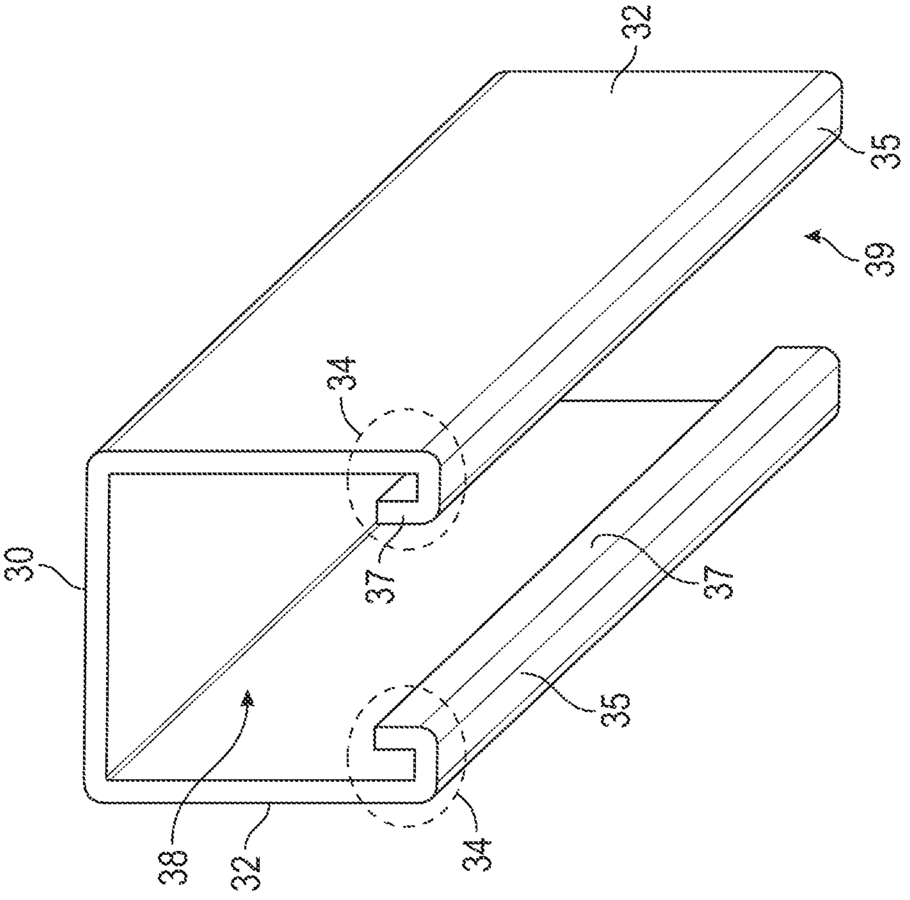
FIG. 14 is an isometric schematic drawing of the exemplary strut of the frame assembly.
Figure 16:
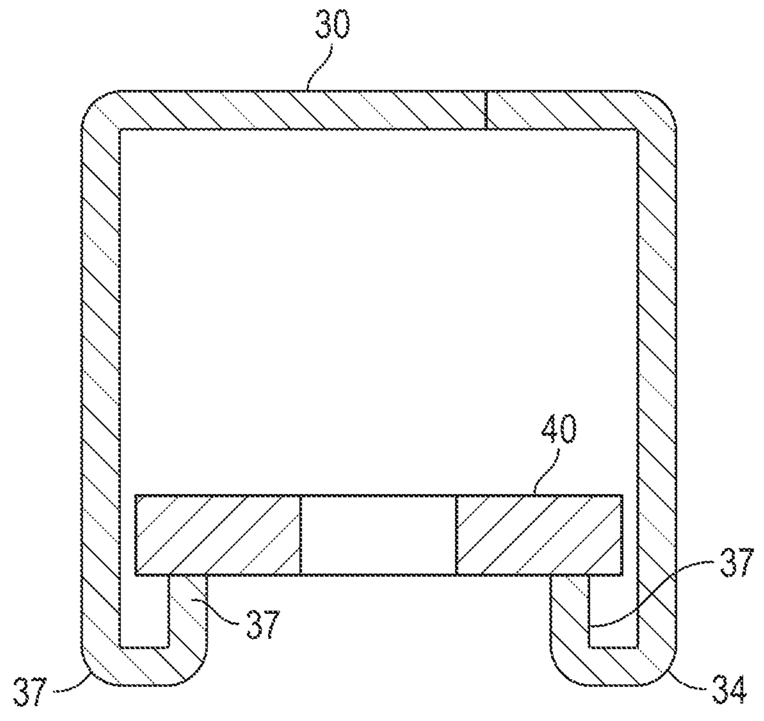
FIG. 16 is a cross-sectional schematic of the strut and one of the channel nuts.
Figure 17:
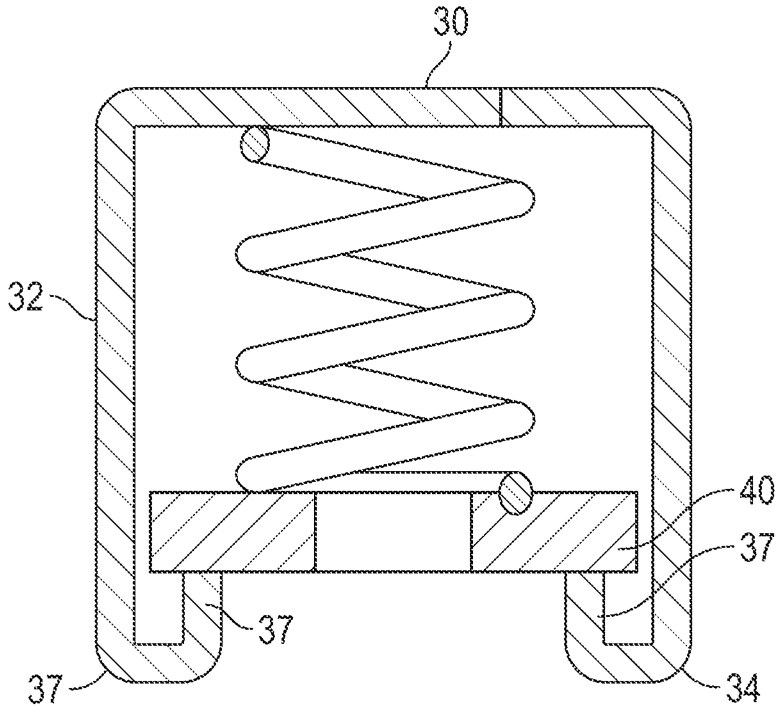
FIG. 17 is a cross-sectional schematic of the strut and one of the channel nuts, where the channel nut is held in place with a spring.

In one aspect, as shown in FIG. 1, the frame assembly 20 includes an upper strut 24-1 and an opposed and parallel lower strut 24-2 that are connected to respective opposed and parallel side struts 26 to form the frame 22 that positioned in the display plane. In an exemplary aspect, each strut of the frame assembly can be formed from a conventional strut channel, which can be, without limitation, formed of metal such as galvanized steel. As shown exemplarily in FIGS. 14 and 15, each strut can include a lop strut portion 30 having longitudinally extending edges and first and second strut legs 32 that are connected to the longitudinally extending edges of the top strut portion and are positioned in parallel planes that are transverse to the top strut portion. Each strut can further include first and second strut flanges 34 that are connected to respective longitudinally extending edges of the respective first and second strut legs. In this aspect, each strut flange 34 has an inwardly projecting portion 35 and optionally, an upwardly projecting portion 37 connected to the edge of the inwardly projecting portion. As further shown in FIG. 15, it is contemplated that the respective inner surface of the top strut, the first and second strut legs, and the first and second strut flanges define a longitudinally extending channel 38 having a first width dimension (d1) in cross-section. Also, in cross-section, the first and second strut flanges 34 are spaced from each other at a second width dimension that is less than the first width dimension (d2) to define a longitudinally extending slot 39 in communication with the channel 38.

In this aspect, the adaptive billboard frame mount system 10 further can comprise a plurality of channel nuts 40 that are sized to be received therein respective channels of a strut of the framing assembly. In this aspect, the width dimension of each channel nut is greater than the second width dimension and the channel nut 40 defines an aperture 42 extending there through that is treaded to receive a mounting bolt.

The plurality of mount assemblies 50 can include a plurality of upper mount assemblies 52 and a plurality of lower mount assemblies 54 that are configured to be mounted to selected poles of the plurality of fixedly positioned pre-existing poles. In one exemplary aspect, each mount assembly includes a pole mount 60, a channel member 80, and an extension member 90. In this aspect, the pole mount is configured to be fixedly mounted to an exterior surface of a fixedly positioned pre-existing pole; the channel member is configured for receipt there through defined channel openings of the respective pole mount; and the extension member has one end configured to be connected to an end portion of the channel member and the opposing end, which forms a mounting flange, configured to connect to portion of the struts forming the frame assembly 60.

Referring to FIGS. 4-5, 8 and 13, the pole mount comprises a base member 62, a first side member 64 and an opposed second side member 66. The base member 62 defines a mounting aperture configured for receipt of a mounting bolt 66. In a further aspect, the first and second side members 64, 66 are positioned in a plane that is transverse to the base member. As shown, each side member has an upper portion 70 that extends outwardly away from an upper surface of the base member and a lower portion 72 that extends outwardly away from a lower surface of the base member. The upper portion 70 of each first and second side members 64, 66 defines a channel opening 74. In one example, and not meant to be limiting, each channel opening 74 has a first elongate portion that extends along a longitudinal axis that is parallel to the upper surface of the base member that terminates in opposed second portions, which both extend in a traverse direction relative to the upper surface of the base member.

Figure 5:
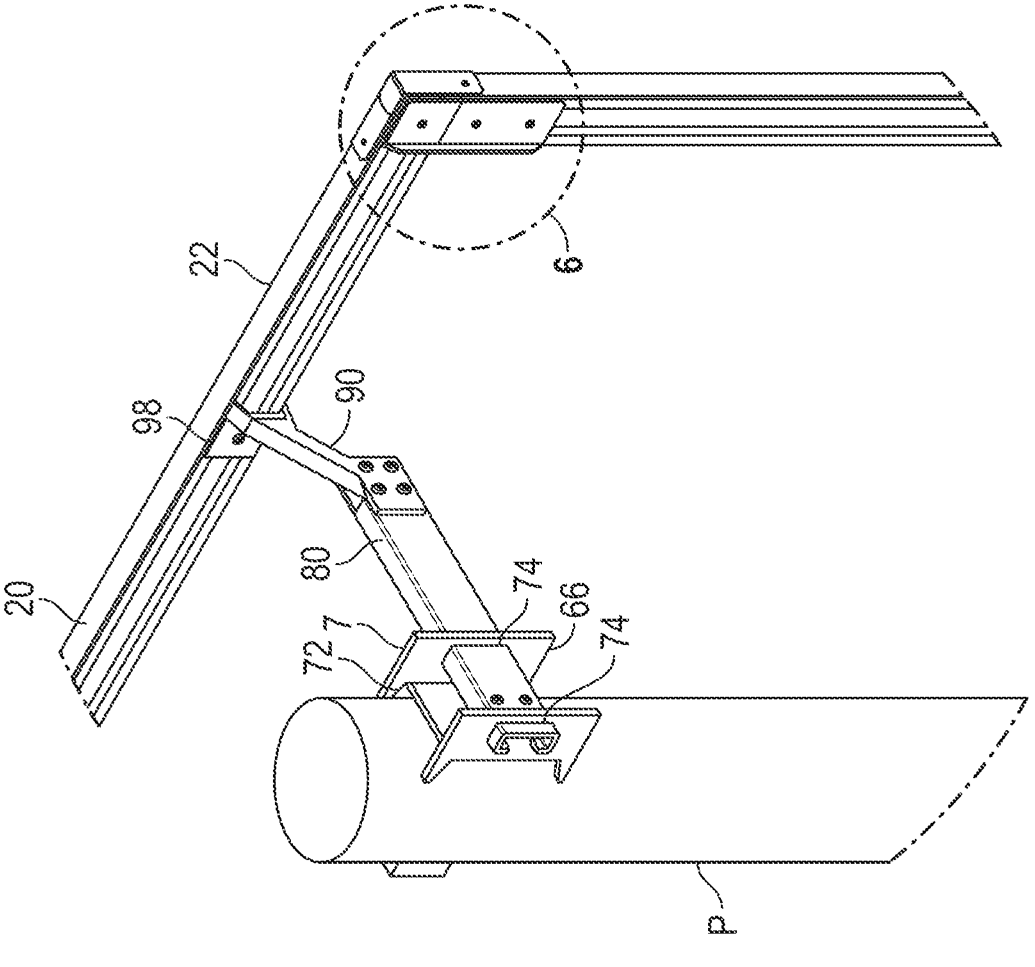
FIG. 5 is an enlarged illustration of a portion of the adaptive billboard frame mount system noted under A in FIG. 4.
Figure 7:
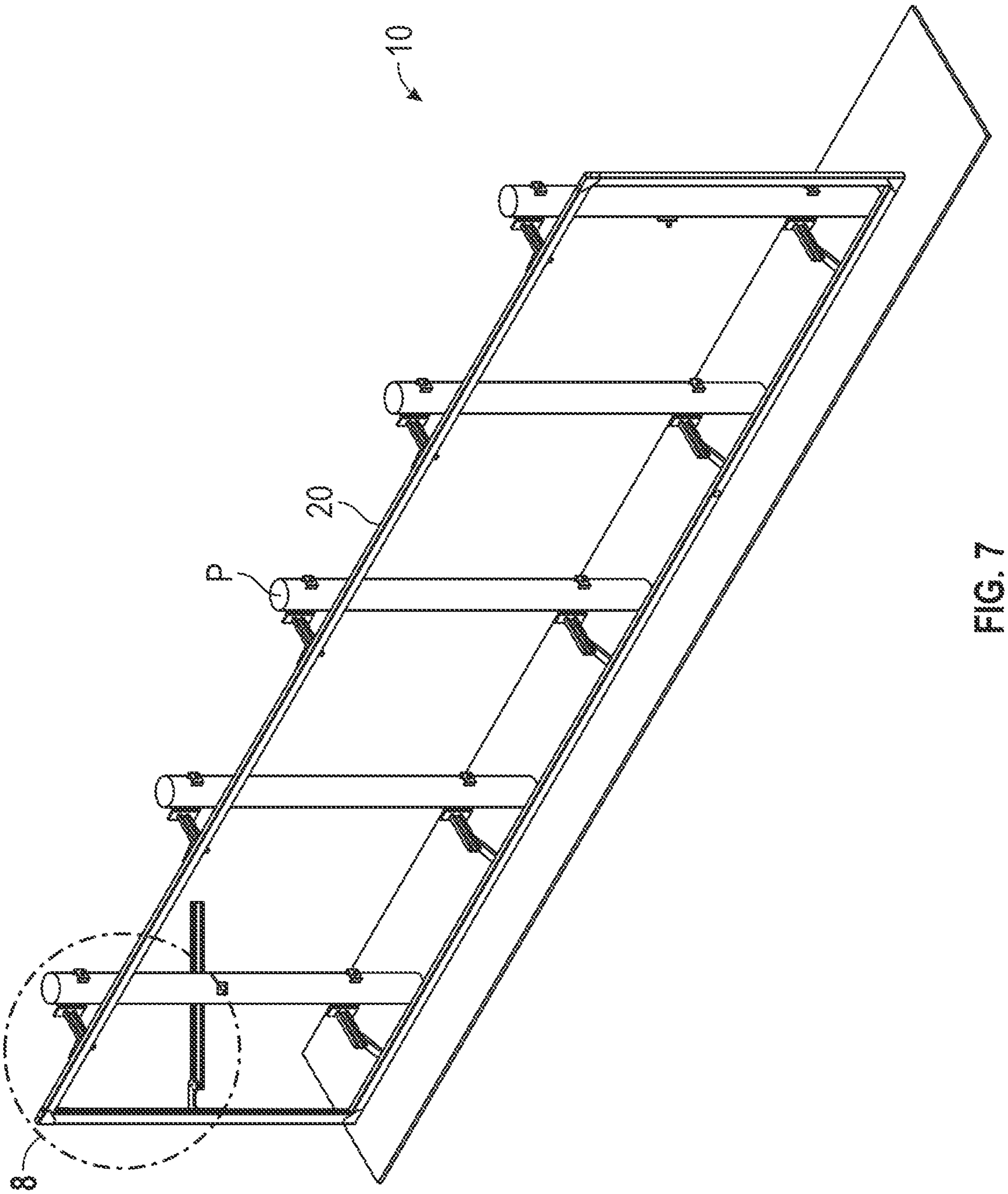
FIG. 7 schematically illustrates a perspective view of the adaptive billboard frame mount system of FIG. 1.
Figure 8:
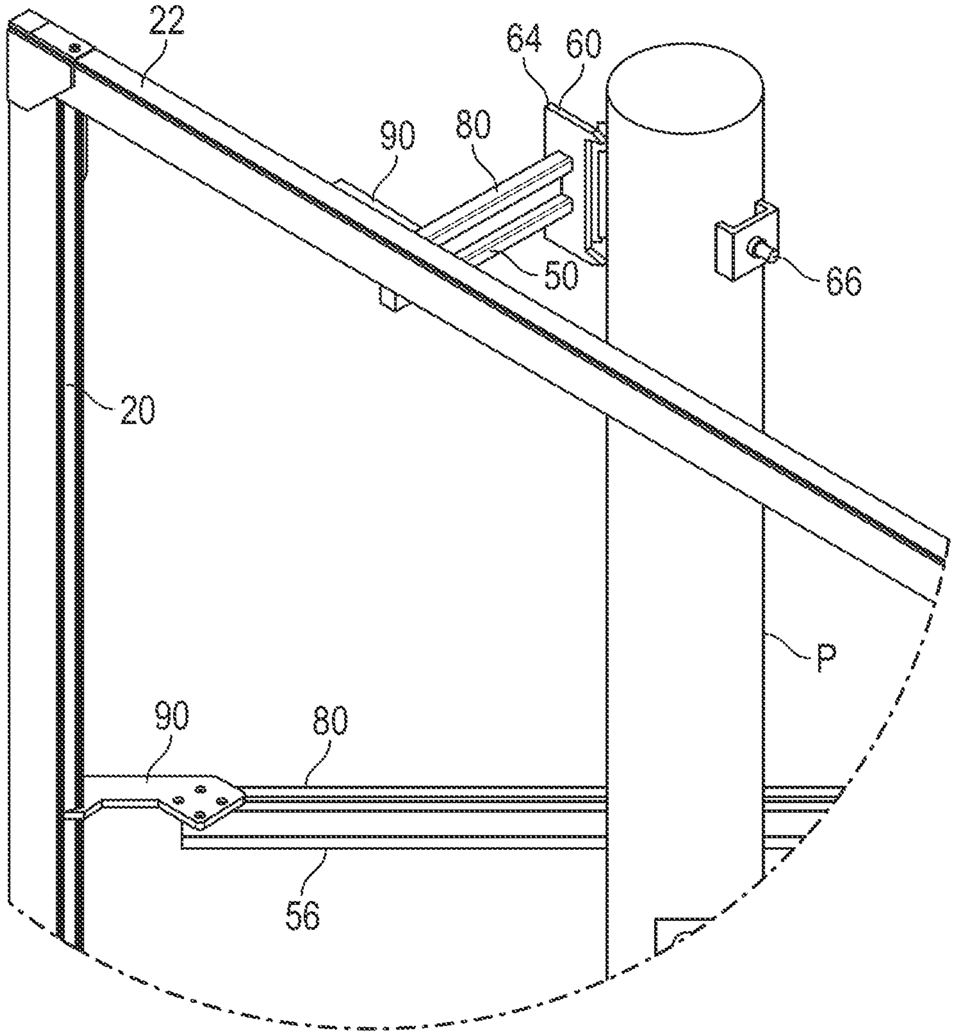
FIG. 8 is an enlarged illustration of a portion of the adaptive billboard frame mount system noted under B in FIG. 7, showing an upper mount assembly connected to the pre-existing pole and an upper strut of the frame assembly and showing a side mount assembly connected to the pre-existing pole and a side strut of the frame assembly.
Figure 9:
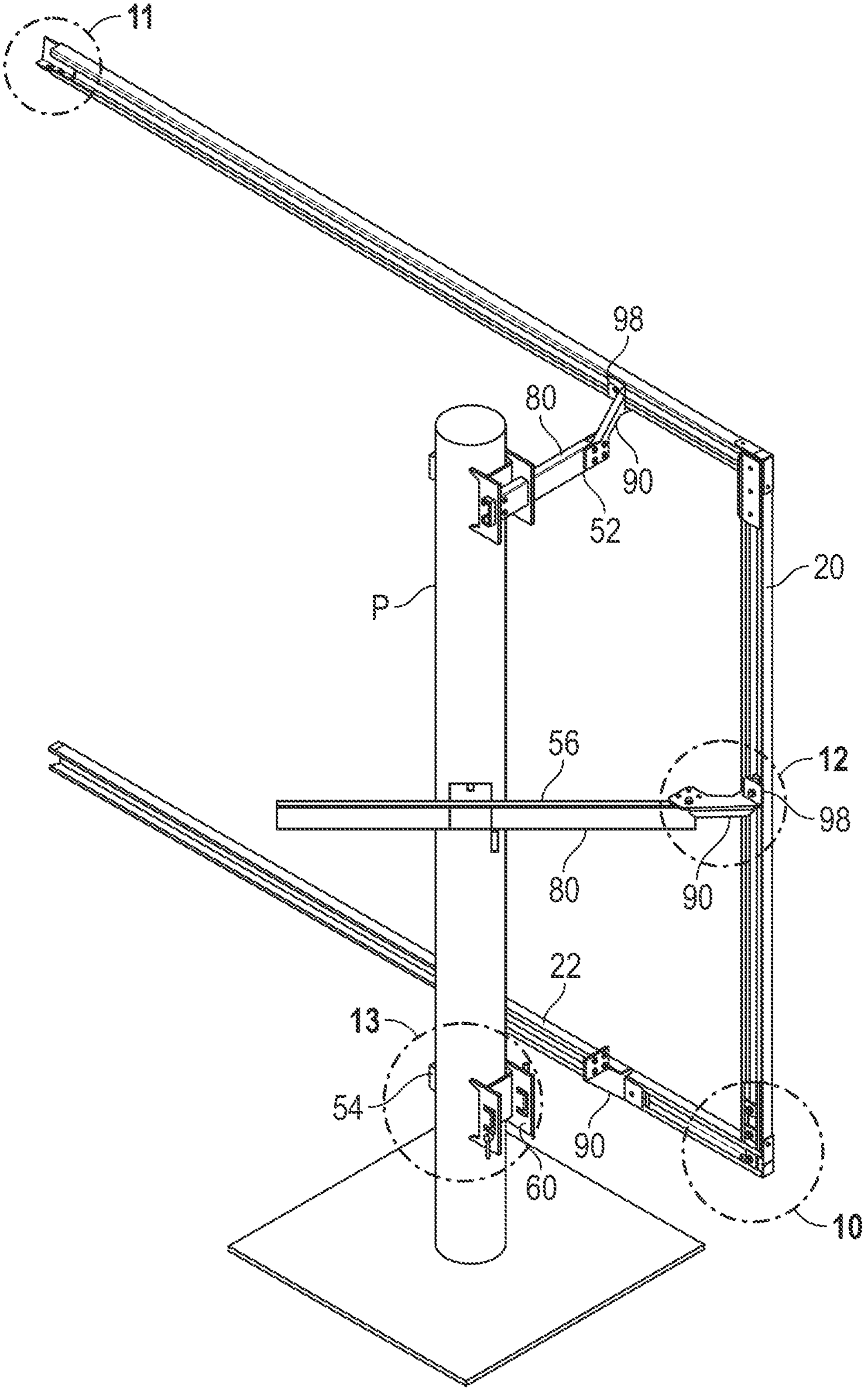
FIG. 9 is an enlarged illustration of a portion of the adaptive billboard frame mount system.
Figure 10:
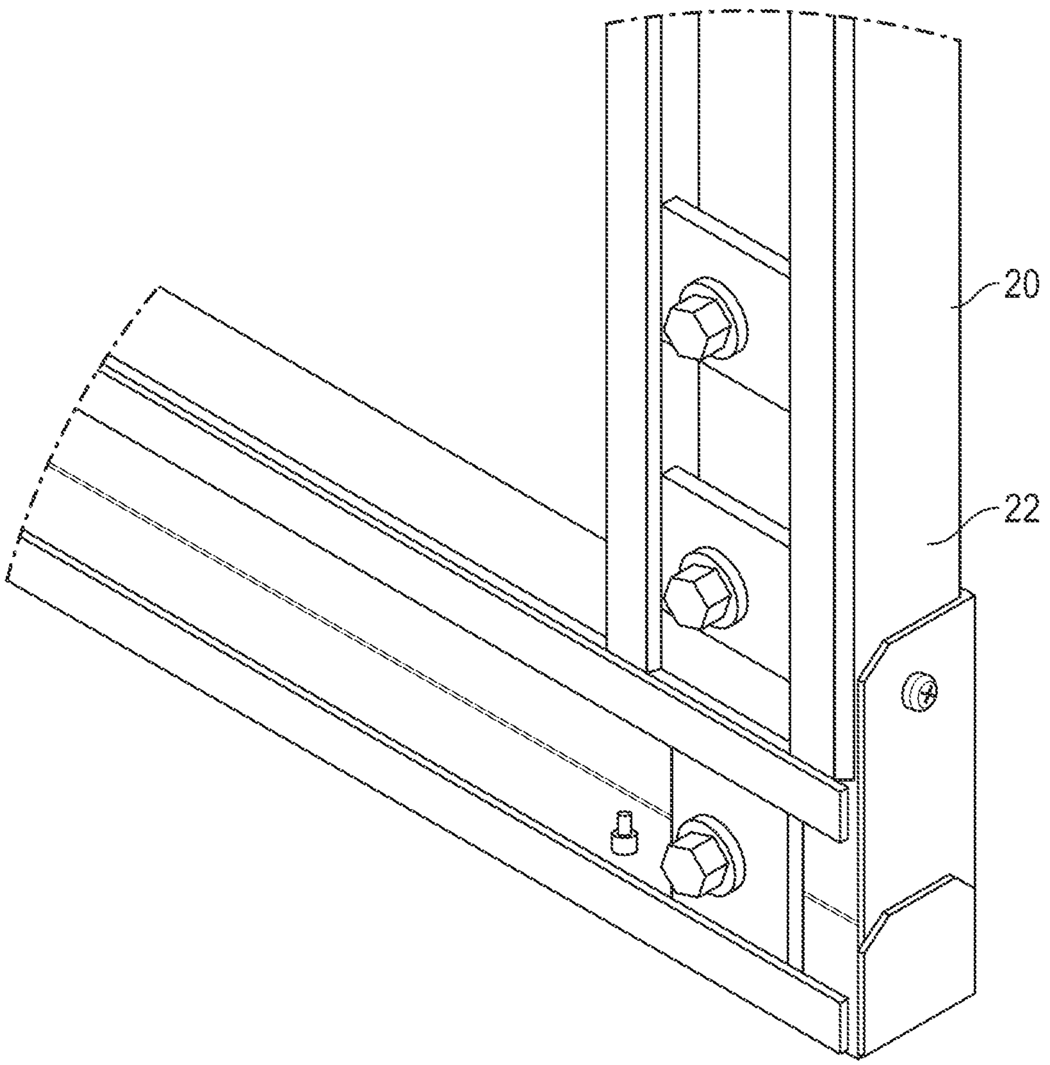
FIG. 10 is an enlarged illustration of a portion of the adaptive billboard frame mount system noted under H in FIG. 9, showing a cover connector plate illustrated in FIG. 6, removed to show the detail of the channel nuts positioned within the respective lower and side struts.
Figure 11:
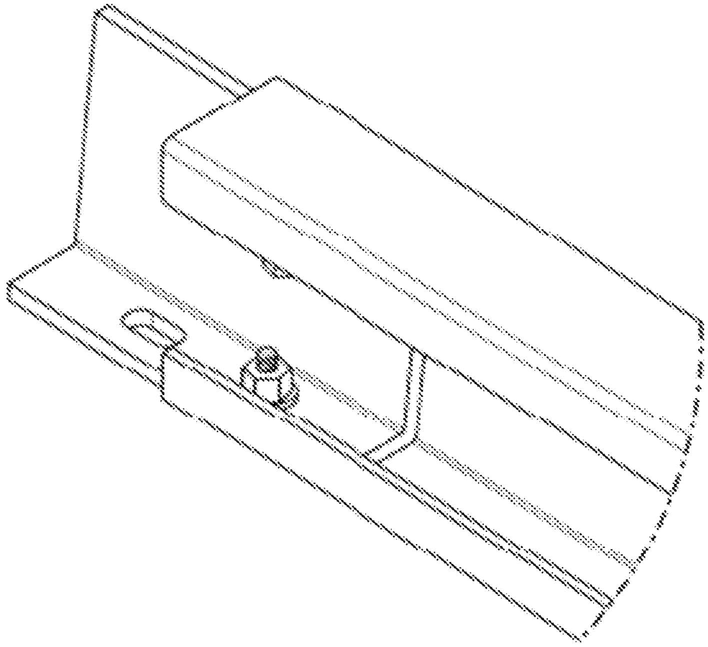
FIG. 11 is an enlarged illustration of a portion of the adaptive billboard frame mount system noted under I in FIG. 9, showing portions of an exemplary struts connected together to form an elongate strut of desired lengthwise dimension.

In a further aspect, and as shown in FIG. 5, the lower portion 72 of each first and second side members can define at least one engagement surface that is configured for fixed mounting with a portion of the pre-existing pole. It is contemplated that the at least one engagement surface can be a frictional engagement surface or, in optional aspect, can have a form that allows for penetration of the portion of the pre-existing pole upon the bolting of the pole mount to the pre-existing pole. In one non-limiting example, and as illustrated, the at least one engagement surface can comprise at least one tooth that is sized and shaped for engagement and/or penetration of the pre-existing pole. As exemplarily shown, the tooth can have a planar pointed V shape.

As shown and contemplated, the channel openings 74 of the respective first and second side members 64, 66 of a pole mount are positioned in opposition so that an elongate channel member 80 can be positioned in both channel openings. As shown, the pole mount 60 is configured to be rotated about an axis extending through the aperture of the base member such that the respective first and second side members are positioned at a desired angle relative to vertical. As one skilled will appreciate, the selective rotational orientation of the pole mount 60 relative to the underlying pole P prior to fixation of the pole mount to the underlying pole allows for the desired orientation of the respective side members of pole mount and their defined channel openings relative to vertical, which provides for mount orientation flexibility.

In an optional aspect, the respective channel openings of the respective first and second side members can be sized to be dimensionally greater than the cross-sectional dimensions of the received channel member. This greater dimensional size of the respective channel openings allows for the receipt of the channel member while allowing for the rotational movement of the channel member relative to the channel openings in the respective first and second side members.

In this aspect, wherein each side member of the pole mount has an outward face and an inward face and a plurality of pole mount flanges 61 are mounted to the outward faces of the each of the side members of a pole mount adjacent to and parallel with the respective second portions of the channel opening. Each pole mount flange 61 extends outwardly away from the outward face of the respective first and second side members and defines a hole that is configured for treaded receipt of a positioning bolt 63. In operation, opposed positioning bolts can be selectively mounted therein the pole mount flange such that the distal end of the respective positioning bolts is forced into contact with respective spaced upper and lower surfaces of first and second planar legs of the channel member to selectively fix a longitudinal axis of the channel member received within the opposing pair of openings relative to the respective first and second side members of the pole mount.

As shown, it is contemplated that one positioning bolt positioned in one of the pole mounts of the first side member and an additional positioning bolt positioned in another pole mount of the second side member is sufficient to selectively lock the elative orientation of the longitudinal axis of the channel member to the pole mount. As one skilled will appreciate, this aspect of the pole mount 60 allows for fine adjustment of the relative orientation of the longitudinal axis of the channel member 80 to the pole mount 60 and to vertical whereas the selective rotational orientation of the pole mount 60 relative to the underlying pole prior to fixation of the pole mount to the underlying pole allows for course orientation.

As shown and described above, the channel member 80 is configured for receipt there through the respective channel openings 74 of the first and second side members. In various aspects, each channel member has a top planar portion having longitudinally extending edges and first and second planar legs that are connected to the longitudinally extending edges of the top planar portion and extend outwardly therefrom into parallel planes that are transverse to the top planar portion. Each channel member can further include first and second channel member flanges that are connected to respective longitudinally extending edges of the respective first and second legs. Optionally, each channel member flange can have an inwardly projecting portion and, in a further option, can have an upwardly projecting portion connected to the edge of the inwardly projecting portion. On skilled will appreciate that it is contemplated that the shape of the oversized channel openings in the respective first and second side members will complement the cross-sectional shape of the channel member for appropriate fit.

Each mount assembly 50 further includes an extension member 90 having a planar body member 92 and a mounting flange 98. In this aspect, the planar body member 92 extends between a first end 94 and a second end 96 along a body member longitudinal axis. As shown, the body member 92 can optionally extend at an acute angle relative to the channel member 80 upon connection of the first end of the body member to a respective first or second end of the top planar portion of the channel member. In a further exemplary aspect, it is contemplated that the body member 92 and channel member 80 can be positioned in a common plane.

In one non-limiting exemplary aspect, the top planar portion of the channel member 80 has a first end and an opposite second end and can further define at least one array of mount openings that can be positioned adjacent to at least one end of the top planar portion. In this example, the first end of the body member can define an array of apertures positioned along an x-y axis with the x-axis of the array of apertures is positioned at an acute angle with respect to the body member longitudinal axis. As one will appreciate, the array of mount openings of the channel member and the array of apertures of the body member are sized to positioned in co-axial relationship when the first end of the body member is positioned in overlapping relationship with the at least one end of the top planar portion of the channel member. In this position, the respective body member and the channel member can be fixedly secured to position the body member at the acute angle relative to the channel member.

Figure 12:
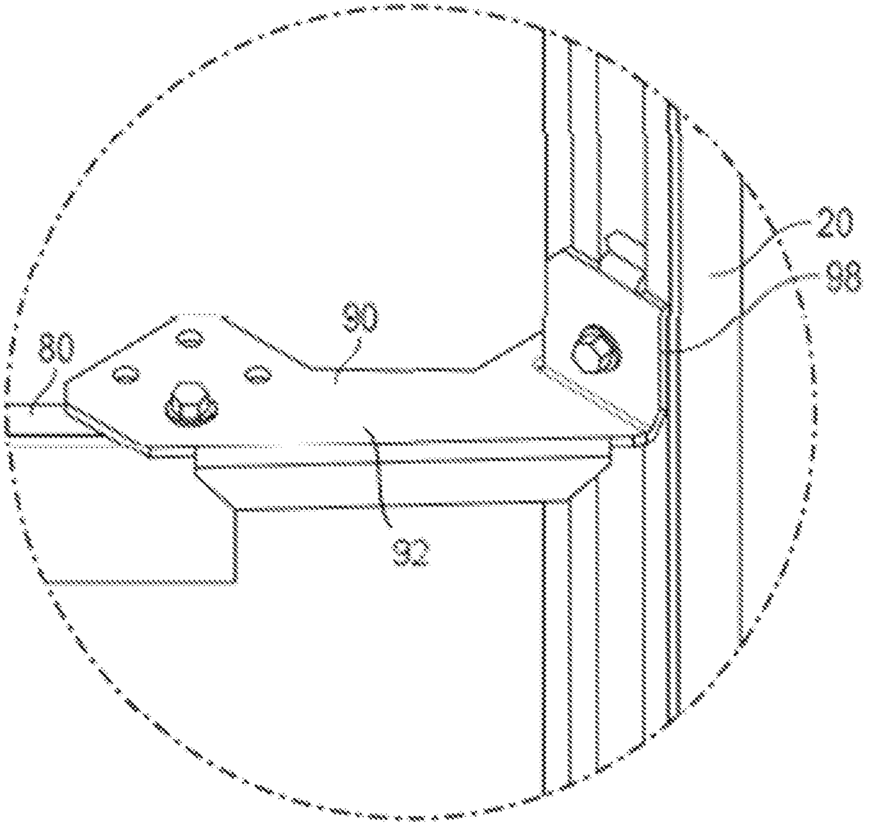
FIG. 12 is an enlarged illustration of a portion of the adaptive billboard frame mount system noted under J in FIG. 9, showing an extension member of a side mount assembly coupled to an end of a channel member and a portion of the side strut of the frame assembly. In this aspect, the respective longitudinal axis of the extension member and the channel member are co-axial.
Figure 13:
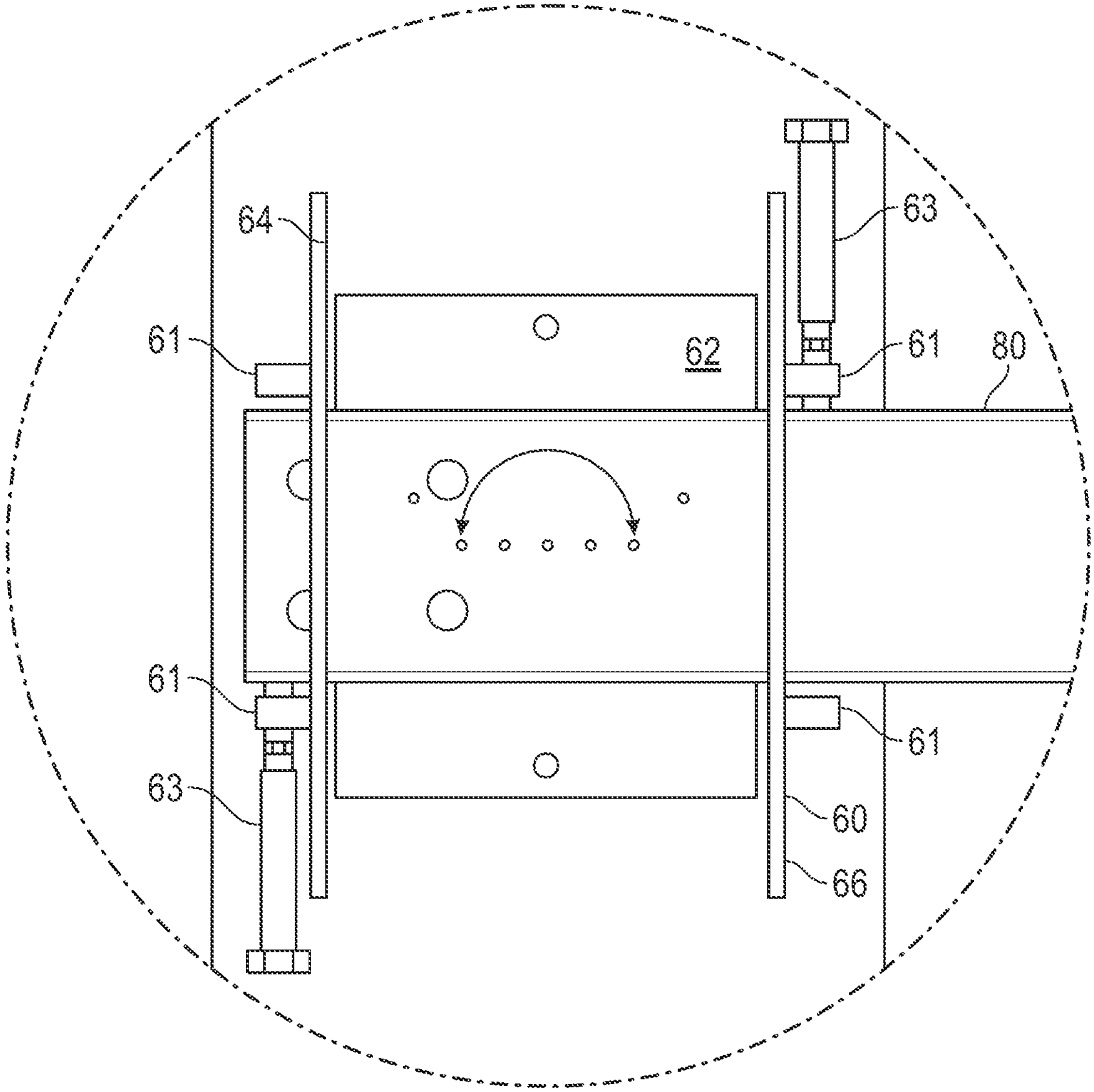
FIG. 13 is an enlarged illustration of a portion of the adaptive billboard frame mount system noted under K in FIG. 9, showing a top view of the base member of the mount assembly and showing a plurality of pole mount flanges mounted to the outward faces of the each of the side members of the pole mount adjacent to and parallel with the respective portions of the channel openings defined in each respective side member.

The mounting flange 98 of the extension member 90 can be mounted to an outer edge portion of the second end of the body member. As shown, the mounting flange 98 can be positioned in a plane transverse to the body member 92 and can be configured to be coupled or otherwise secured to the frame assembly. In one aspect and as shown in FIG. 12, each mounting flange 98 can define a hole extending trough that is configured to receive a mounting bolt that is sized and dimensions to fixatedly couple the mounting flange to one respective channel nut of the frame assembly.

As illustrated, the respective mounting flanges 98 of the plurality of upper mount assemblies and the plurality of lower mount assemblies are configured to be mounted to selected portions of the respective upper and lower struts of the frame assembly. Optionally however in the adaptive billboard frame mount system, the plurality of mount assemblies can further include a pair of side mount assemblies 56 that are configured to be mounted to the two outermost positioned poles of the plurality of fixedly positioned pre-existing poles. In this aspect, the respective mounting flanges of the pair of side mount assemblies are configured to be mounted to selected portions of the respective side struts of the frame assembly to help stabilize the side struts of the formed frame. As shown, when positioned with respect to the two outermost positioned poles of the plurality of fixedly positioned pre-existing poles and the frame, a longitudinal axis of the channel member of each side mount assembly is positioned at an acute angle with respect to the longitudinal axis of the channel member of each respective upper and lower mount assembly. Further, in this aspect it is contemplated that a longitudinal length of the channel member of each side mount assembly is greater than the longitudinal length of the channel member of each respective upper and lower mount assembly.

The foregoing has described various embodiments of an adaptive billboard frame mount system and methods of operation thereof; and, in particular, to systems utilizing channel struts. The disclosed systems and methods are provided to illustrate the essential and optional features and functions, and those skilled in the art may conceive of alternatives or modifications that do not depart from the principles of the invention as encompassed by the appended claims, and that such alternatives or modifications may be functionally equivalent.

We claim:

1. An adaptive billboard frame mount system for mounting to a plurality of fixedly positioned pre-existing poles, comprising:

a frame assembly comprising an upper strut and an opposed and parallel lower strut, wherein respective ends of the upper and lower struts are connected to respective opposed and parallel side struts to form a frame that positioned in a display plane that is positioned at a desired angle relative to vertical;

a plurality of mount assemblies, wherein the plurality of mount assemblies comprises a plurality of upper mount assemblies and a plurality of lower mount assemblies that are configured to be mounted to selected poles of the plurality of fixedly positioned pre-existing poles; wherein each mount assembly comprises:

a pole mount configured to be fixedly mounted to an exterior surface of a fixedly positioned pre-existing pole, comprising:

a base member defining a mounting aperture configured for receipt of a mounting bolt;

a first side member and an opposed second side member, wherein the first and second side members are positioned in a plane that is transverse to the base member, each side member having an upper portion extending outwardly away from an upper surface of the base member and a lower portion extending outwardly away from a lower surface of the base member, wherein the upper portion of each first and second side members defines a channel opening, wherein the channel opening in each first and second side members are positioned in opposition;

a channel member configured for receipt there through the respective channel openings of the respective first and second side members, wherein the respective channel openings of the respective first and second side members are dimensionally greater than the cross-sectional dimensions of the received channel member; and an extension member.

2. The adaptive billboard frame mount system of claim 1, wherein each channel member comprises:

a top planar portion having longitudinally extending edges;

first and second planar legs connected to the longitudinally extending edges of the top planar portion, the first and second legs being positioned in parallel planes that are transverse to the top planar portion; and first and second channel member flanges connected to respective longitudinally extending edges of the respective first and second legs, each channel member flange having an inwardly projecting portion, wherein the base member is configured to be rotated about an axis extending through the aperture of the base member such that the respective first and second side members are positioned at a desired angle relative to vertical.

3. The adaptive billboard frame mount system of claim 2, wherein the extension member comprises:

a planar body member extending along a body member longitudinal axis and having a first end and a second end, wherein the body member extends at an acute angle relative to the channel member upon connection of the first end of the body member to a respective first or second end of the top planar portion of the channel member, and a mounting flange mounted to an outer edge of the second end of the body member, the mounting flange positioned in a plane transverse to the body member, wherein the mounting flange of each mount assembly is coupled to the frame assembly.

4. The adaptive billboard frame mount system of claim 3, wherein each channel opening has a first elongate portion that extends along a longitudinal axis that is parallel to the upper surface of the base member and terminates in opposed second portions that extend along an axis that is transverse to the upper surface of the base member.

5. The adaptive billboard frame mount system of claim 4, wherein each side member of the pole mount has an outward face and an inward face, further comprising a plurality of pole mount flanges mounted to the outward faces of the each of the side members of a pole mount adjacent to and parallel with the respective second portions of the channel opening, wherein each pole mount flange defines a hole that is configured for receipt of a positioning bolt, and wherein opposed positioning bolts are configured to be selectively mounted there though the pole mount flange and into contact with respective spaced upper and lower surfaces of the first and second first and second planar legs of the channel member to selectively fix a longitudinal axis of the channel member relative to the respective first and second side members of the pole mount.

6. The adaptive billboard frame mount system of claim 5, wherein each pole mount flange extends outwardly away from the outward face of the respective first and second side members.

7. The adaptive billboard frame mount system of claim 3, wherein the body member and mount channel member are positioned in a common plane.

8. The adaptive billboard frame mount system of claim 3, wherein each channel member flange has an upwardly projecting portion connected to the edge of the inwardly projecting portion.

9. The adaptive billboard frame mount system of claim 3, wherein the lower portion of each first and second side members defines at least one frictional surface for engaging a portion of the pre-existing pole.

10. The adaptive billboard frame mount system of claim 9, wherein the frictional surface comprises at least one tooth configured for engagement and/or penetration of the pre-existing pole.

11. The adaptive billboard frame mount system of claim 3, wherein each strut of the frame assembly comprises:

a top strut portion having longitudinally extending edges;

first and second strut legs connected to the longitudinally extending edges of the top strut portion and positioned in parallel planes that are transverse to the top strut portion;

first and second strut flanges connected to respective longitudinally extending edges of the respective first and second strut legs, wherein each strut flange has an inwardly projecting portion, wherein, in cross-section, the respective inner surface of the top strut, the first and second strut legs, and the first and second strut flanges define a channel having a first width dimension, and wherein, in cross-section, the first and second strut flanges are spaced from each other at a second width dimension that is less than the first width dimension and defines a slot in communication with the channel.

12. The adaptive billboard frame mount system of claim 11, further comprising a plurality of channel nuts that are sized to be received therein the respective channel of each strut, wherein the width dimension of each channel nut is greater than the second width dimension, wherein each channel nut defines an aperture extending there through that is treaded to receive a mounting bolt.

13. The adaptive billboard frame mount system of claim 12, wherein each mounting flange defines a hole extending therethrough that is configured to receive the mounting bolt such that the mounting bolt fixatedly couples the mounting flange to one respective channel nut.

14. The adaptive billboard frame mount system of claim 11, wherein each strut flange has an upwardly projecting portion connected to the edge of the inwardly projecting portion.

15. The adaptive billboard frame mount system of claim 3, wherein the top planar portion of the channel member has a first end and an opposite second end, and wherein the top planar portion of the channel member defines at least one array of mount openings positioned adjacent to at least one end of the top planar portion.

16. The adaptive billboard frame mount system of claim 15, wherein the first end of the body member defines an array of apertures positioned along an x-y axis, wherein the x-axis of the array of apertures is positioned at an acute angle with respect to the body member longitudinal axis.

17. The adaptive billboard frame mount system of claim 3, wherein the respective mounting flanges of the plurality of upper mount assemblies and the plurality of lower mount assemblies are configured to be mounted to selected portions of the respective upper and lower struts of the frame assembly.

18. The adaptive billboard frame mount system of claim 3, wherein the plurality of mount assemblies further comprises a pair of side mount assemblies that are configured to be mounted to the two outermost positioned poles of the plurality of fixedly positioned pre-existing poles, wherein the respective mounting flanges of the pair of side mount assemblies are configured to be mounted to selected portions of the respective side struts of the frame assembly.

19. The adaptive billboard frame mount system of claim 18, wherein a longitudinal axis of the channel member of each side mount assembly is positioned at an acute angle with respect to the longitudinal axis of the channel member of each respective upper and lower mount assembly.

20. The adaptive billboard frame mount system of claim 19, wherein a longitudinal length of the channel member of each side mount assembly is greater than the longitudinal length of the channel member of each respective upper and lower mount assembly.

21. An adaptive billboard frame mount system for mounting to a plurality of fixedly positioned pre-existing poles, comprising:

a frame assembly comprising an upper strut and an opposed and parallel lower strut, wherein respective ends of the upper and lower struts are connected to respective opposed and parallel side struts to form a frame that positioned in a display plane that is positioned at a desired angle relative to vertical;

a plurality of mount assemblies, wherein the plurality of mount assemblies comprises a plurality of upper mount assemblies and a plurality of lower mount assemblies that are configured to be mounted to selected poles of the plurality of fixedly positioned pre-existing poles; wherein each mount assembly comprises:

a pole mount configured to be fixedly mounted to an exterior surface of a fixedly positioned pre-existing pole, comprising:

a base member defining a mounting aperture configured for receipt of a mounting bolt;

a first side member and an opposed second side member, wherein the first and second side members are positioned in a plane that is transverse to the base member, each side member having an upper portion extending outwardly away from an upper surface of the base member and a lower portion extending outwardly away from a lower surface of the base member, wherein the upper portion of each first and second side members defines a channel opening;

a channel member configured for receipt there through the respective channel openings of the respective first and second side members; and an extension member comprising:

a planar body member extending along a body member longitudinal axis and having a first end and a second end, a mounting flange mounted to an outer edge of the second end of the body member, the mounting flange positioned in a plane transverse to the body member, wherein the mounting flange of each mount assembly is coupled to the frame assembly.

22. The adaptive billboard frame mount system of claim 20, wherein each channel member comprises:

a top planar portion having longitudinally extending edges;

first and second planar legs connected to the longitudinally extending edges of the top planar portion, the first and second legs being positioned in parallel planes that are transverse to the top planar portion; and first and second channel member flanges connected to respective longitudinally extending edges of the respective first and second legs, each channel member flange having an inwardly projecting portion.

23. The adaptive billboard frame mount system of claim 22, wherein the channel opening in each first and second side members are positioned in opposition, wherein the base member is configured to be rotated about an axis extending through the aperture of the base member such that the respective first and second side members are positioned at a desired angle relative to vertical.

24. The adaptive billboard frame mount system of claim 23, wherein the body member extends at an acute angle relative to the channel member upon connection of the first end of the body member to a respective first or second end of the top planar portion of the channel member.

25. The adaptive billboard frame mount system of claim 22, wherein the respective channel openings of the respective first and second side members are dimensionally greater than the cross-sectional dimensions of the received channel member.

26. The adaptive billboard frame mount system of claim 24, wherein each channel opening has a first elongate portion that extends along a longitudinal axis that is parallel to the upper surface of the base member and terminates in opposed second portions that extend along an axis that is transverse to the upper surface of the base member.

27. The adaptive billboard frame mount system of claim 25, wherein each side member of the pole mount has an outward face and an inward face, further comprising a plurality of pole mount flanges mounted to the outward faces of the each of the side members of a pole mount adjacent to and parallel with the respective second portions of the channel opening, wherein each pole mount flange defines a hole that is configured for receipt of a positioning bolt, and wherein opposed positioning bolts are configured to be selectively mounted there though the pole mount flange and into contact with respective spaced upper and lower surfaces of the first and second first and second planar legs of the channel member to selectively fix a longitudinal axis of the channel member relative to the respective first and second side members of the pole mount.

28. The adaptive billboard frame mount system of claim 23, wherein each pole mount flange extends outwardly away from the outward face of the respective first and second side members.

29. The adaptive billboard frame mount system of claim 23, wherein the body member and mount channel member are positioned in a common plane.

30. The adaptive billboard frame mount system of claim 23, wherein each channel member flange has an upwardly projecting portion connected to the edge of the inwardly projecting portion.

31. The adaptive billboard frame mount system of claim 23, wherein the lower portion of each first and second side members defines at least one frictional surface for engaging a portion of the pre-existing pole.

32. The adaptive billboard frame mount system of claim 23, wherein each strut of the frame assembly comprises:

a top strut portion having longitudinally extending edges;

first and second strut legs connected to the longitudinally extending edges of the top strut portion and positioned in parallel planes that are transverse to the top strut portion;

first and second strut flanges connected to respective longitudinally extending edges of the respective first and second strut legs, wherein each strut flange has an inwardly projecting portion, wherein, in cross-section, the respective inner surface of the top strut, the first and second strut legs, and the first and second strut flanges define a channel having a first width dimension, and wherein, in cross-section, the first and second strut flanges are spaced from each other at a second width dimension that is less than the first width dimension and defines a slot in communication with the channel.

33. The adaptive billboard frame mount system of claim 31, further comprising a plurality of channel nuts that are sized to be received therein the respective channel of each strut, wherein the width dimension of each channel nut is greater than the second width dimension, wherein each channel nut defines an aperture extending there through that is treaded to receive a mounting bolt, and wherein each mounting flange defines a hole extending through that is configured to receive the mounting bolt such that the mounting bolt fixatedly couples the mounting flange to one respective channel nut.

34. The adaptive billboard frame mount system of claim 33, wherein each strut flange has an upwardly projecting portion connected to the edge of the inwardly projecting portion.

35. The adaptive billboard frame mount system of claim 23, wherein the top planar portion of the channel member has a first end and an opposite second end, wherein the top planar portion of the channel member defines at least one array of mount openings positioned adjacent to at least one end of the top planar portion, wherein the first end of the body member defines an array of apertures positioned along an x-y axis, and wherein the x-axis of the array of apertures is positioned at an acute angle with respect to the body member longitudinal axis.

36. The adaptive billboard frame mount system of claim 23, wherein the respective mounting flanges of the plurality of upper mount assemblies and the plurality of lower mount assemblies are configured to be mounted to selected portions of the respective upper and lower struts of the frame assembly.

37. The adaptive billboard frame mount system of claim 23, wherein the plurality of mount assemblies further comprises a pair of side mount assemblies that are configured to be mounted to the two outermost positioned poles of the plurality of fixedly positioned pre-existing poles, wherein the respective mounting flanges of the pair of side mount assemblies are configured to be mounted to selected portions of the respective side struts of the frame assembly, wherein a longitudinal axis of the channel member of each side mount assembly is positioned at an acute angle with respect to the longitudinal axis of the channel member of each respective upper and lower mount assembly, and wherein a longitudinal length of the channel member of each side mount assembly is greater than the longitudinal length of the channel member of each respective upper and lower mount assembly.

38. An adaptive billboard frame mount system for mounting to a plurality of fixedly positioned pre-existing poles, comprising:

a frame assembly comprising an upper strut and an opposed and parallel lower strut, wherein respective ends of the upper and lower struts are connected to respective opposed and parallel side struts to form a frame that positioned in a display plane that is positioned at a desired angle relative to vertical;

a plurality of mount assemblies, wherein the plurality of mount assemblies comprises a plurality of upper mount assemblies and a plurality of lower mount assemblies that are configured to be mounted to selected poles of the plurality of fixedly positioned pre-existing poles; wherein each mount assembly comprises:

a pole mount configured to be fixedly mounted to an exterior surface of a fixedly positioned pre-existing pole, comprising:

a base member defining a mounting aperture configured for receipt of a mounting bolt;

a first side member and an opposed second side member, wherein the first and second side members are positioned in a plane that is transverse to the base member, each side member having an upper portion extending outwardly away from an upper surface of the base member and a lower portion extending outwardly away from a lower surface of the base member, wherein the upper portion of each first and second side members defines a channel opening;

a channel member configured for receipt there through the respective channel openings of the respective first and second side members; and an extension member.

* * * * *